US012811534B2

(12) United States Patent
Kang et al.

(10) Patent No.: US 12,811,534 B2
(45) Date of Patent: Nov. 24, 2026

(54) MOTOR DRIVING APPARATUS AND METHOD OF CONTROLLING THE SAME

(71) Applicant: HYUNDAI MOBIS CO., LTD., Seoul (KR)

(72) Inventors: Tae Hwan Kang, Incheon (KR); Hyung Min Park, Seoul (KR); Joo Won Park, Seoul (KR); Beom Cheol Cho, Seoul (KR); Yun Ho Choi, Uiwang-si (KR); Yeon Ho Kim, Seoul (KR); Won Hee Jo, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 450 days.

(21) Appl. No.: 18/380,858

(22) Filed: Oct. 17, 2023

(65) Prior Publication Data

US 2024/0128915 A1 Apr. 18, 2024

(30) Foreign Application Priority Data

Oct. 18, 2022 (KR) ........................ 10-2022-0134339

(51) Int. Cl.
*H02P 1/00* (2006.01)
*H02P 27/08* (2006.01)
*H02P 29/028* (2016.01)

(52) U.S. Cl.
CPC .......... *H02P 27/085* (2013.01); *H02P 29/028* (2013.01)

(58) Field of Classification Search
CPC ............................ H02P 27/085; H02P 29/028
USPC ............................................ 318/504, 400.39
See application file for complete search history.

(56) References Cited

U.S. PATENT DOCUMENTS

| | | | | |
|---|---|---|---|---|
| 8,988,021 | B2 * | 3/2015 | Clothier | H02P 6/181 318/722 |
| 10,267,819 | B2 * | 4/2019 | Son | G01P 3/44 |
| 2016/0233800 | A1 * | 8/2016 | Fukuta | H02P 6/16 |
| 2017/0305274 | A1 * | 10/2017 | Saha | H02H 7/1227 |
| 2019/0181789 | A1 * | 6/2019 | Masuda | H02K 7/116 |
| 2022/0115975 | A1 * | 4/2022 | Musaliyarakam | H02P 29/028 |

* cited by examiner

*Primary Examiner* — Erick D Glass
(74) *Attorney, Agent, or Firm* — MORGAN, LEWIS & BOCKIUS LLP

(57) ABSTRACT

Disclosed is a motor driving apparatus including: a motor; an inverter including a switching element for driving the motor; a controller for controlling the switching element; a resolver including an excitation winding and a detection winding; and a resolver chip applying an excitation signal to the excitation winding by inputting a periodic signal from the controller, and receiving a feedback signal from the detection winding, wherein the resolver chip determines the number of rotations of the motor based on a change in a pulse width of a detection signal resulting from a comparison between a voltage of the feedback signal and a preset voltage, and output a signal to the inverter for setting an inertial driving control mode according to the number of rotations of the motor in a failure state of the controller.

20 Claims, 5 Drawing Sheets

MOTOR DRIVING APPARATUS AND METHOD OF CONTROLLING THE SAME

CROSS REFERENCE TO RELATED APPLICATION

The present application claims priority to Korean Patent Application No. 10-2022-0134339, filed 18 Oct. 2022, the entire contents of which is incorporated herein for all purposes by this reference.

TECHNICAL FIELD

The present disclosure relates to a motor driving apparatus and method of controlling the same that controls inertial driving of a vehicle according to the number of rotations of a motor in the event of a failure in a controller.

BACKGROUND

An electrified vehicle drives an electric motor by the energy stored in a battery via an inverter and transfers the driving power of the motor to the wheels. To this end, the electrified vehicle may be provided with a controller for switching a switching element included in the inverter.

The electrified vehicle performs inertial driving in the event of a failure in controller while driving and may enter inertial driving control mode. The inertial driving control mode of the vehicle may include a freewheeling mode and an active short circuit (ASC) mode. The freewheeling mode may have a characteristic that a large reverse torque of the motor is generated during high-speed driving, and the ASC mode may have a characteristic that a large reverse torque of the motor is generated during low-speed driving.

The reverse torque of the motor generated during inertial driving may cause a collision with a rear vehicle. For example, when the controller is failed while driving at high speed, and the inertial driving control mode is not switched from freewheeling mode to ASC mode, the vehicle may decelerate rapidly, resulting in a collision with the rear vehicle.

Accordingly, the electrified vehicle may determine the number of rotations of the electric motor to appropriately switch the inertial driving control mode according to the vehicle speed in the event of the failure in the controller.

In general, the electrified vehicle measures the period of the current value of the motor detected via a current sensor, which is provided with the logic that determines the number of rotations of the electric motor. However, there may be a sensing error between the current sensor and the determining logic, and a separate pin is required to transmit information.

On the other hand, the electrified vehicle may control the motor accurately by detecting the rotational angle and rotational speed of the vehicle through a resolver. To this end, the electrified vehicle may dispose a resolver interface chip between the resolver and the controller.

Matters described as the related art are provided merely for promoting understanding for the background of the disclosure, and should not be taken as the prior art already known to a person having ordinary knowledge in the art.

SUMMARY DISCLOSURE

Therefore, the present disclosure has been made in view of the above problems, and it is an object of the present disclosure to provide a motor driving apparatus and a method of controlling the same that measures the number of rotations of a motor based on a feedback signal output from a resolver, and sets an inertial driving control mode according to the number of rotations of the motor in a failure state of a controller.

The technical objects to attain in the present disclosure are not limited to the above-described technical objects and other technical objects which are not described herein will become apparent to those skilled in the art from the following description.

To accomplish the above technical objects, according to one aspect of the present disclosure, there is provided a motor driving apparatus including: a motor; an inverter including a switching element for driving the motor; a controller for controlling the switching element; a resolver including an excitation winding and a detection winding; and a resolver chip applying an excitation signal to the excitation winding by inputting a periodic signal from the controller and receiving a feedback signal from the detection winding, wherein the resolver chip determines the number of rotations of the motor based on a change in a pulse width of a detection signal resulting from a comparison between a voltage of the feedback signal and a preset voltage, and output a signal to the inverter for setting an inertial driving control mode according to the number of rotations of the motor in a failure state of the controller.

In addition, to accomplish the above technical object, a method of controlling the motor driving apparatus including: applying an excitation signal to an excitation winding of a resolver; receiving a feedback signal from a detection winding of the resolver; determining the number of rotations of a motor based on a change in a pulse width of a detection signal resulting from a comparison between a voltage of the feedback signal and a preset voltage; and setting an inertial driving control mode according to the number of rotations of the motor in a failure state of the controller.

In addition, to accomplish the above technical object, there is provided a motor controller including: a controller outputting a switching control signal to an inverter that drives a motor; and a resolver chip configured to electrically connect to a resolver including an excitation winding and a detection winding, apply an excitation signal to the excitation winding by receiving a periodic signal from the controller, and receive a feedback signal from the detection winding, wherein the resolver chip determines the number of rotations of the motor based on a change in a pulse width of a detection signal resulting from a comparison between a voltage of feedback signal and a preset voltage, and output a signal to the inverter for setting an inertial driving control mode according to the number of rotations of the motor in a failure state of the controller.

In addition, to accomplish the above technical object, there is provided a resolver chip including a comparator outputting a detection signal by comparing between a voltage of a feedback signal received from a detection winding and a preset voltage; and a digital logic measuring a signal wave period of the feedback signal by sensing a change in a pulse width of the detection signal.

According to the present disclosure, to set an inertial driving control mode according to the number of rotations of a motor in a failure state of a controller, the number of rotations of the motor may be measured efficiently and accurately by measuring the number of rotations of the motor based on a feedback signal output from a resolver.

Advantages which may be obtained in this specification are not limited to the aforementioned advantages, and various other advantages may be evidently understood by those skilled in the art to which the present disclosure pertains from the following description.

DETAILED DESCRIPTION

Figure 1:
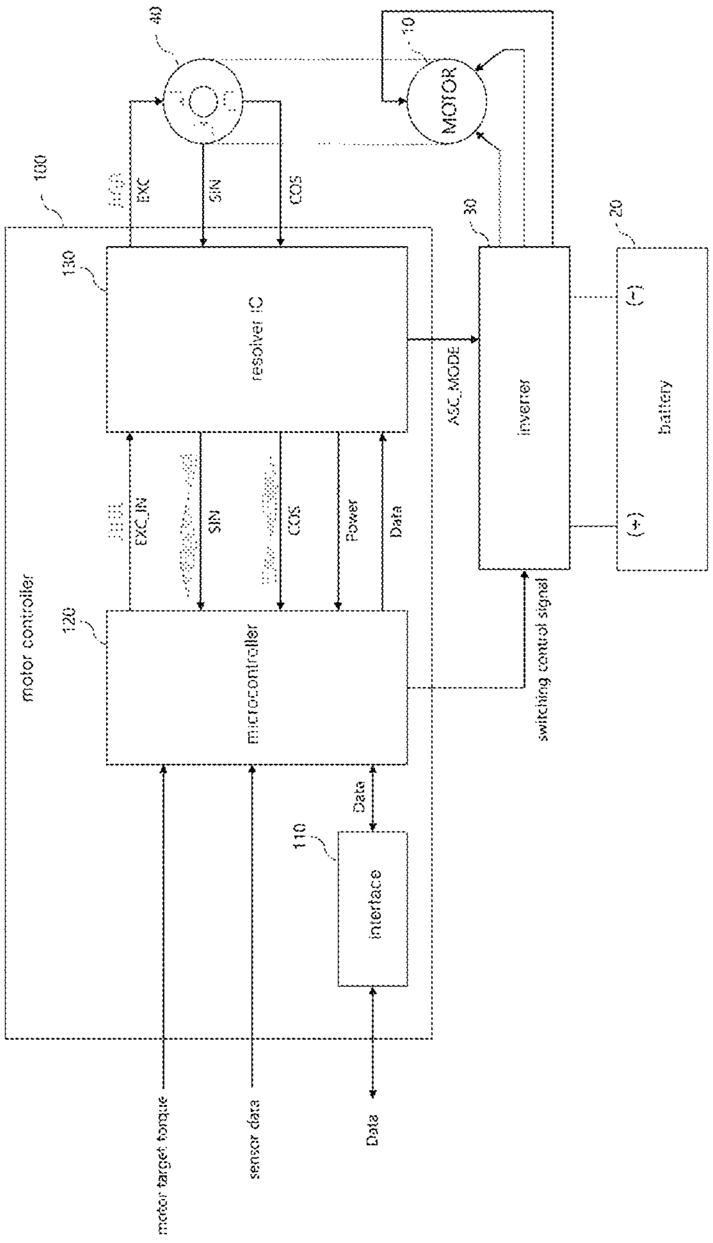
FIG. 1 is a diagram showing a configuration of a motor driving apparatus according to an embodiment of the present disclosure.

Hereinafter, embodiments of the present disclosure will be described in greater detail with reference to the accompanying drawings. In describing the present disclosure, for ease of understanding, the same reference numerals are used to denote the same components throughout the drawings, and repetitive description on the same components will be omitted.

In the description of the following embodiments, the term "preset" means that the numerical value of a parameter is determined in advance when the parameter is used in a process or algorithm. Depending on an embodiment, the numerical value of a parameter may be set when a process or algorithm starts or may be set during a period in which the process or algorithm is executed.

In terms of describing the embodiments of the present disclosure, detailed descriptions of related art will be omitted when they may make the subject matter of the embodiments of the present disclosure rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and spirit of the present disclosure.

Terms such as "first" and "second" may be used to describe various components, but the components should not be limited by the above terms. In addition, the above terms are used only for the purpose of distinguishing one component from another.

As used herein, the singular form is intended to include the plural forms as well, unless context clearly indicates otherwise.

In the present application, it will be further understood that the terms "comprises," "includes," etc. specify the presence of stated features, integers, steps, operations, elements, components, or combinations thereof, but do not preclude the presence or addition of one or more other features, integers, steps, operations, elements, components, or combinations thereof.

Further, terms "unit" or "control unit" forming part of the names of a motor control unit (MCU), etc. are merely terms that are widely used in the naming of a controller for controlling a specific function of a vehicle and should not be construed as meaning a generic function unit. For example, each controller is a communication device that communicates with other controllers or sensors to control the function that is responsible for, a memory that stores an operating system or logic commands and input and output information, and one or more processor that performs determination, calculation, decision, and the like, which is necessary for the control the function that is responsible therefor.

FIG. 1 is a diagram showing a configuration of a motor driving apparatus according to an embodiment of the present disclosure.

As shown in FIG. 1, the motor driving apparatus may include a motor 10, a battery 20, an inverter 30, a resolver 40, and a motor controller 100.

The motor 10 may include a plurality of windings corresponding to each of a plurality of phases.

The battery 20 may have a positive terminal (+) and a negative terminal (−).

The inverter 30 includes the motor 10 for driving a plurality of switching elements, and as switching element is switched, the voltage in the battery 20 may be converted to AC voltage corresponding to each of a plurality of phases and output to a plurality of windings included in the motor 10.

The resolver 40 may include one-phase excitation winding and two-phase detection winding to detect the rotational angle and rotational speed of the motor 10.

The motor controller 100 may include an interface 110, a microcontroller 120, and a resolver chip 130.

The interface 110 may transmit and receive data via an individual electronic control unit (ECU) of internal electrified vehicle, a sensor, or a control area network (CAN) communication, and the like. The interface 110 may directly or indirectly transmit the received data to the microcontroller 120 and the resolver chip 130.

The microcontroller 120 may receive the motor target torque and the sensor data as inputs to generate a switching control signal for switching the switching elements included in the inverter 30. The motor target torque may be input from a higher-level controller of the motor controller 100, such as a vehicle control unit (VCU) and a hybrid control unit (HCU). The sensor data may receive input from the sensor related to driving the motor 10. The switching control signal may output via a pulse width modulation (PWM) control.

The resolver chip 130 may include a resolver interface (not shown) that is electrically connected to the microcontroller 120 and the resolver 40 to transmit signals mutually, and a power supply chip (not shown) that supplies power to the microcontroller 120.

The resolver chip 130 may receive a periodic signal EXC_IN from the microcontroller 120, apply an excitation signal EXC to the excitation winding of the resolver 40, receive feedback signals SIN, COS from the two-phase detection winding of the resolver 40, and transmit the feedback signals SIN, COS to the microcontroller 120. Therefore, the microcontroller 120 may detect the rotational angle and rotational speed of the motor via the feedback signals SIN, COS. Here, the periodic signal EXC_IN may correspond to a square wave, and the excitation signal EXC may correspond to a sinusoidal wave.

In the event of a failure in the microcontroller 120 while driving the vehicle, the resolver chip 130 may output an ASC mode signal ASC_MODE to the inverter 30 for setting the inertial driving control mode.

The inertial driving control mode may include a freewheeling mode and an active short circuit (ASC) mode. The ASC mode signal ASC_MODE is inactivated in the freewheeling mode and activated in the ASC mode.

When the inertial driving control mode is set to the freewheeling mode, a switching element included in the inverter 30 may electrically isolate one end of the plurality of windings included in the motor 10 from the positive terminal and negative terminal of the battery 20.

When the inertial driving control mode is set to the ASC mode, a switching element included in the inverter 30 may electrically connect one end of the plurality of windings included in the motor 10 from the positive terminal and negative terminal of the battery 20.

On the other hand, in the state of failure in the microcontroller 120, there may be a difference in the reverse torque generated in the motor 10 depending on the setting of the inertial driving control mode. In particular, the freewheeling mode may have a higher reverse torque generated by the motor compared to the ASC mode in a region where the number of rotations of the motor 10 is higher than the preset number of rotations, and the ASC mode may have a higher reverse torque generated by the motor 10 compared to the freewheeling mode in a region where the number of rotations of the motor 10 is lower than the preset number of rotations.

Since the reverse torque of the motor 10 generated during inertial driving, depending on the magnitude of the reverse torque, causes the vehicle to decelerate rapidly and collide with the rear vehicle, the resolver chip 130 may set the inertial driving control mode to the freewheeling mode when the number of rotations of the motor 10 is lower than the preset number of rotations in the failure state of the microcontroller 120. In addition, the resolver chip 130 may set the inertial driving control mode to ASC mode when the number of rotations of the motor 10 is higher than the preset number of rotations in the failure state of the microcontroller 120.

The resolver chip 130 may determine the number of rotations of the motor 10 via the feedback signals SIN, COS to set the inertial driving control mode according to the number of rotations of the motor 10 in the failure state of the microcontroller 120.

In particular, the resolver chip 130 may determine the number of rotations of the motor 10 based on a change in the pulse width of the detection signal resulting a comparison between the voltage of the feedback signals SIN, COS, and a preset voltage.

Unlike in the present embodiment, the resolver chip 130 may receive a current sensor of the motor 10 through an external input pin and measure the period of the current value to determine the number of rotations of the motor 10, however, the external input pin needs to be provided separately, and there may be a sensing error between the current sensor and the resolver chip 130.

On the other hand, the resolver chip 130 may internally generate a periodic signal EXC_IN in the failure state of the microcontroller 120 to apply an excitation signal EXC to the excitation winding of the resolver 40.

The configuration and operation method of the resolver chip 130 will be described in detail with reference to FIG. 3.

Figure 2:
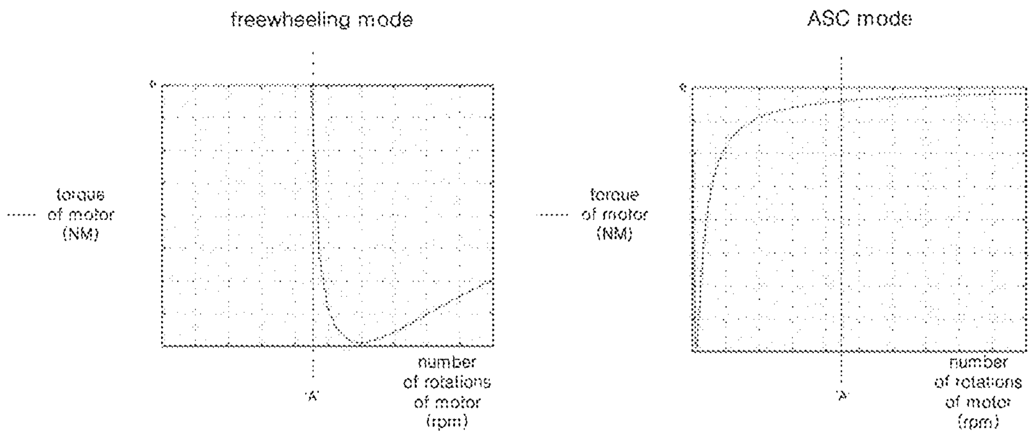
FIG. 2 is a diagram describing an inertial driving control mode according to an embodiment of the present disclosure.

FIG. 2 is a diagram describing an inertial driving control mode according to an embodiment of the present disclosure.

With reference to FIG. 2, the torque (Nm) of the motor according to the number of rotations (RPM) of the motor is shown for each inertial driving control mode.

In a region where the number of rotations of the motor 10 is lower than the preset number of rotations 'A', the reverse torque of the motor 10 generated in the freewheeling mode may be lower than the reverse torque of the motor 10 generated in the ASC mode.

In addition, in a region where the number of rotations of the motor 10 is higher than the preset number of rotations 'A', the reverse torque of the reverse torque of the motor 10 generated in the ASC mode may be lower than the reverse torque of the motor 10 generated in the freewheeling mode.

Figure 3:
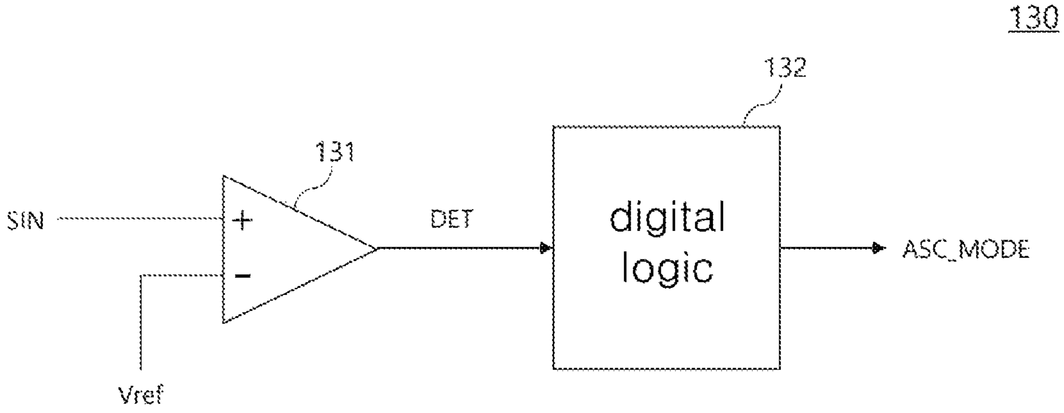
FIG. 3 is a diagram illustrating an example of a resolver chip configuration according to an embodiment of the present disclosure.

FIG. 3 is a diagram illustrating an example of a resolver chip configuration according to an embodiment of the present disclosure.

With reference to FIG. 3, the resolver chip 130 may include a comparator 131 and a digital logic 132.

The comparator 131 may output a detection signal DET by comparing a level of a feedback signal SIN voltage and a level of a level of a preset reference voltage $V_{ref}$. More specifically, the comparator 131 may activate the detection signal DET to the logic high level in a region where the level of the feedback signal SIN voltage is higher than the level of the level of the preset reference voltage $V_{ref}$. According to an embodiment, the comparator 131 may activate the detection signal DET in a region where the level of the feedback signal SIN voltage is lower than the level of the reference voltage $V_{ref}$. In addition, the comparator 131 may receive the feedback signal COS instead of the feedback signal SIN. According to an embodiment, the comparator 131 may be implemented as a peak-delay comparator that detects a physical delay on the path from the periodic signal EXC-IN to the feedback signals SIN, COS.

The digital logic 132 may detect a change in the pulse width of the detection signal DEC to generate the peak delay signal (not shown), determines the number of rotations of the motor 10 according to a period of a peak detection signal, and output the ASC mode signal ASC_MODE for setting the inertial driving control mode according to the number of rotations of the motor 10 in the failure state of the controller 120.

More specifically, the digital logic 132 may activate the peak detection signal when the pulse width of the detection signal DET is decreased and determine the number of rotations of the motor 10 according to the activation period of the peak detection signal. The digital logic 132 may determine the number of rotations of the motor as the activation period of the peak detection signal is shortened. The operation method by which the digital logic 132 determines the number of rotations of the motor 10 via the detection signal DEC output from the comparator 131 to set the inertial driving control mode will be described in detail below with reference to FIG. 4.

Figure 4:
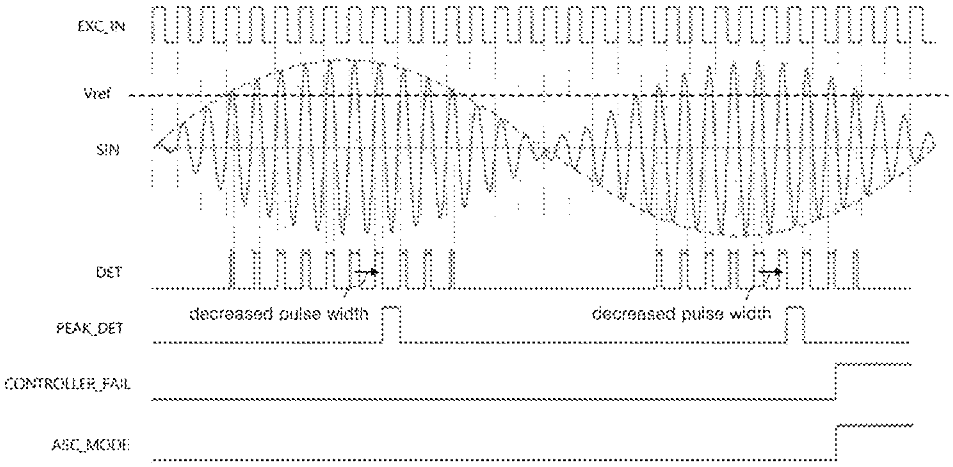
FIG. 4 is a diagram describing an operation of setting an inertial driving control mode by determining the number of rotations of a motor in a resolver chip according to an embodiment of the present disclosure.

FIG. 4 is a diagram describing an operation of setting an inertial driving control mode by determining the number of rotations of a motor in a resolver chip according to an embodiment of the present disclosure.

With reference to FIG. 4, the period of the carrier wave for the feedback signal SIN may be set to be the same as the period of the periodic signal EXC_IN.

The comparator 131 may activate the detection signal DET in a region where the level of the feedback signal SIN voltage is higher than the level of the reference voltage $V_{ref}$.

The digital logic 132 may detect a decrease in the pulse width of the detection signal DET to activate the peak detection signal PEAK_DET, and determine the number of rotations of the motor 10 according to the activation period of the peak detection signal PEAK_DET. Here, the activation period of the peak detection signal PEAK_DET may be half the signal wave period for the feedback signal SIN. In other words, the digital logic 132 may detect a change in the pulse width of the detection signal DET to generate a peak detection signal PEAK_DET, and measure the signal wave period for the feedback signal SIN according to the activation period of the peak detection signal PEAK_DET. According to an embodiment, the digital logic 132 may determine the number of rotations of motor 10 based on the measured signal wave period.

The digital logic 132 may activate the ASC mode signal ASC_MODE when the number of rotations of the motor 10 is higher than a preset number of rotations, based on a failure signal CONTROLLER_FAIL that is activated in response to a failure of the controller 120.

Figure 5:
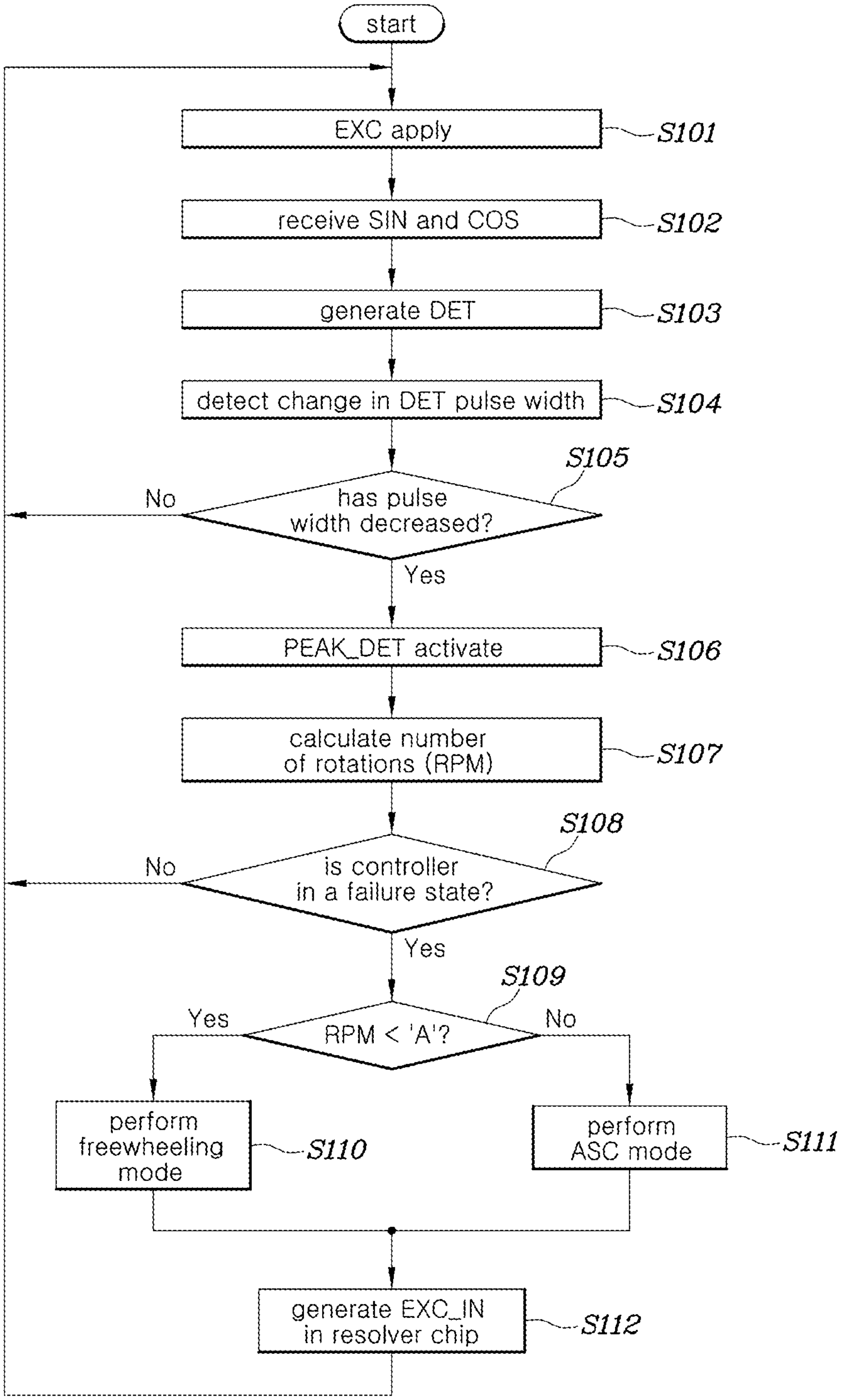
FIG. 5 is a flowchart describing a method of controlling a motor driving apparatus according to an embodiment of the present disclosure.

FIG. 5 is a flowchart describing a method for controlling a motor driving apparatus according to an embodiment of the present disclosure.

With reference to FIG. 5, the resolver chip 130 may receive a periodic signal EXC_IN from the microcontroller 120 and apply an excitation signal EXC to the excitation winding of the resolver 40 (S101) and receive feedback signals SIN, COS from the detection winding of the resolver 40 (S102).

Then, the resolver chip 130 may determine the number of rotations (RPM) of the motor 10 based on a change in the pulse width of the detection signal DET resulting from a comparison between the voltage of the feedback signals SIN, COS and a preset voltage (S103 to S107). The resolver chip 130 may set the inertial driving control modes according to the number of rotations (RPM) of the motor 10 in the failure state of the microcontroller 120 (S108 to S111).

More specifically, the comparator 131 may generate a detection signal DET by comparing the levels of the feedback signal voltages with the level of a preset reference voltage $V_{ref}$ (S103).

The digital logic 132 detects a change in the pulse width of the detection signal DET (S104) and determine whether the pulse width of the detection signal DET is decreased according to a detection result (S105).

When the pulse width of the detection signal DET is decreased (YES in S105), the digital logic 132 may activate the peak detection signal PEAK_DET (S106). Here, the activation period of the peak detection signal PEAK_DET may be half the signal wave period for the feedback signals SIN, COS.

The digital logic 132 may calculate the number of rotations RPM of the motor according to the activation period of the peak detection signal PEAK_DET. More specifically, the digital logic 132 may determine that the shorter the activation period of the peak detection signal PEAK_DET, the higher the number of rotations of the motor 10.

The digital logic 132 may determine whether the microcontroller 120 is in the failure state or not (S108).

When the microcontroller 120 is determined to be in a failure state (YES in S108), the digital logic 132 may compare the number of rotations (RPM) of the motor 10 to a preset number of rotations 'A' (S109).

When the number of rotations (RPM) of the motor 10 is less than a preset number of rotations 'A' (YES in S109), the digital logic 132 may set the inertial driving control mode to freewheeling mode (S110). Here, a switching element included in the inverter 30 may electrically isolate one end of the plurality of windings included in the motor 10 from the battery 20.

When the number of rotations (RPM) of the motor 10 is higher than the preset number of rotations 'A' (NO in S109), the digital logic 132 may set the inertial driving control mode to ASC mode (S111). Here, the switching element included in the inverter 30 may electrically connect one end of the plurality of windings included in the motor 10 with the positive terminal or negative terminal of the battery 20.

The resolver chip 130 may internally generate a periodic signal EXC_IN when the microcontroller 120 is determined to be in a failure state (S112).

What is claimed is:

1. A motor driving apparatus comprising:
a motor;
an inverter including a switching element for driving the motor;
a controller configured to switch the switching element;
a resolver including an excitation winding and a detection winding; and
a resolver chip configured to apply an excitation signal to the excitation winding by inputting a periodic signal from the controller, and configured to receive a feedback signal from the detection winding,
wherein the resolver chip is configured to determine a number of rotations of the motor based on a change in a pulse width of a detection signal resulting from a comparison between a voltage of the feedback signal and a preset voltage, and is configured to output a signal to the inverter for setting an inertial driving control mode according to the number of rotations of the motor in a failure state of the controller.

2. The motor driving apparatus of claim 1, wherein the resolver chip comprises:
a comparator configured to output the detection signal by comparing between a voltage of the feedback signal received from a detection winding and a level of a preset voltage; and
a digital logic configured to generate a peak detection signal by sensing a change in a pulse width of the detection signal, configured to determine the number of rotations of the motor according to a period of the peak detection signal, and configured to set the inertial driving control mode according to the number of rotations in a failure state of the controller.

3. The motor driving apparatus of claim 2, wherein the digital logic is configured to activate the peak detection signal when the pulse width of the detection signal is decreased.

4. The motor driving apparatus of claim 3, wherein an activation period of the peak detection signal corresponds to one half of a signal wave period for the feedback signal.

5. The motor driving apparatus of claim 4, wherein the digital logic is configured to determine the number of rotations of the motor as the activation period of the peak detection signal is shorter.

6. The motor driving apparatus of claim 1, wherein the resolver chip is configured to:
set the inertial driving mode to a first control mode when a preset number of rotations is lower than the number of rotations of the motor in a failure state of the controller; and
set the inertial driving mode to a second control mode when the preset number of rotations is higher than the number of rotations of the motor in a failure state of the controller.

7. The motor driving apparatus of claim 6, wherein,
in the first control mode, reverse torque generated by the motor is higher than that of the second control mode in a region where the number of rotations of the motor is higher than the preset number of rotations, and
in the second control mode, the reverse torque generated by the motor is higher than that of the first control mode in a region where the number of rotations of the motor is lower than the preset number of rotations.

8. The motor driving apparatus of claim 6, wherein the switching element is configured to electrically isolate one end of a plurality of windings included in the motor from a battery when the inertial driving control mode is set to the first control mode.

9. The motor driving apparatus of claim 6, wherein the switching element is configured to electrically connect one end of a plurality of windings included in the motor to one end of a battery when the inertial driving control mode is set to the first control mode.

10. The motor driving apparatus of claim 1, wherein the resolver chip is configured to internally generate a periodic signal in a failure state of the controller.

11. A method for controlling a motor driving apparatus, comprising:

applying an excitation signal to an excitation winding of a resolver;

receiving a feedback signal from a detection winding of the resolver;

determining a number of rotations of a motor based on a change in a pulse width of a detection signal resulting from a comparison between a voltage of the feedback signal and a preset voltage, the determining the number of rotations of the motor comprising:

generating the detection signal by comparing a level of the feedback signal voltage and a level of the preset voltage;

detecting a change in a pulse width of the detection signal;

generating a peak detection signal according to a detection result; and calculating the number of rotations of the motor according to a period of the peak detection signal; and setting an inertial driving control mode according to the number of rotations of the motor in a failure state of a controller.

12. The method of claim 11, wherein the determining the number of rotations of the motor comprises:

generating the detection signal by comparing a level of the feedback signal voltage and a level of the preset voltage;

detecting a change in a pulse width of the detection signal;

generating a peak detection signal according to a detection result; and calculating the number of rotations of the motor according to a period of the peak detection signal.

13. The method of claim 12, wherein the generating the peak detection signal comprises activating the peak detection signal when a pulse width of the detection signal is decreased.

14. The method of claim 13, wherein an activation period of the peak detection signal corresponds to one half of a signal wave period for the feedback signal.

15. The method of claim 13, wherein the calculating the number of rotations of the motor further comprises determining that a shorter activation period of the peak detection signal result in a higher number of rotations of the motor.

16. The method of claim 11, wherein a setting of the inertial control mode comprises:

determining whether the controller is in a failure state;

comparing the number of rotations of the motor to a preset number of rotations when the controller is determined as in a failure state;

setting the inertial driving control mode to a first control mode when the number of rotations of the motor is lower than the preset number of rotations; and setting the inertial driving control mode to a second control mode when the number of rotations of the motor is higher than the preset number of rotations.

17. The method of claim 16, wherein in the first control mode, reverse torque generated by the motor is higher than that of the second control mode in a region where the number of rotations of the motor is higher than the preset number of rotations, and in the second control mode, the reverse torque generated by the motor is higher than that of the first control mode in a region where the number of rotations of the motor is lower than the preset number of rotations.

18. The method of claim 16 further comprising electrically isolating one end of a plurality of windings included in the motor from a battery when the inertial driving control mode is set to the first control mode.

19. The method of claim 16 further comprising electrically connecting one end of a plurality of windings included in the motor to one end of a battery when the inertial driving control mode is set to the first control mode.

20. The method of claim 11 further comprising generating, when the controller is determined as in a failure state, a periodic signal in a resolver chip.

* * * * *